UNITED STATES PATENT OFFICE.

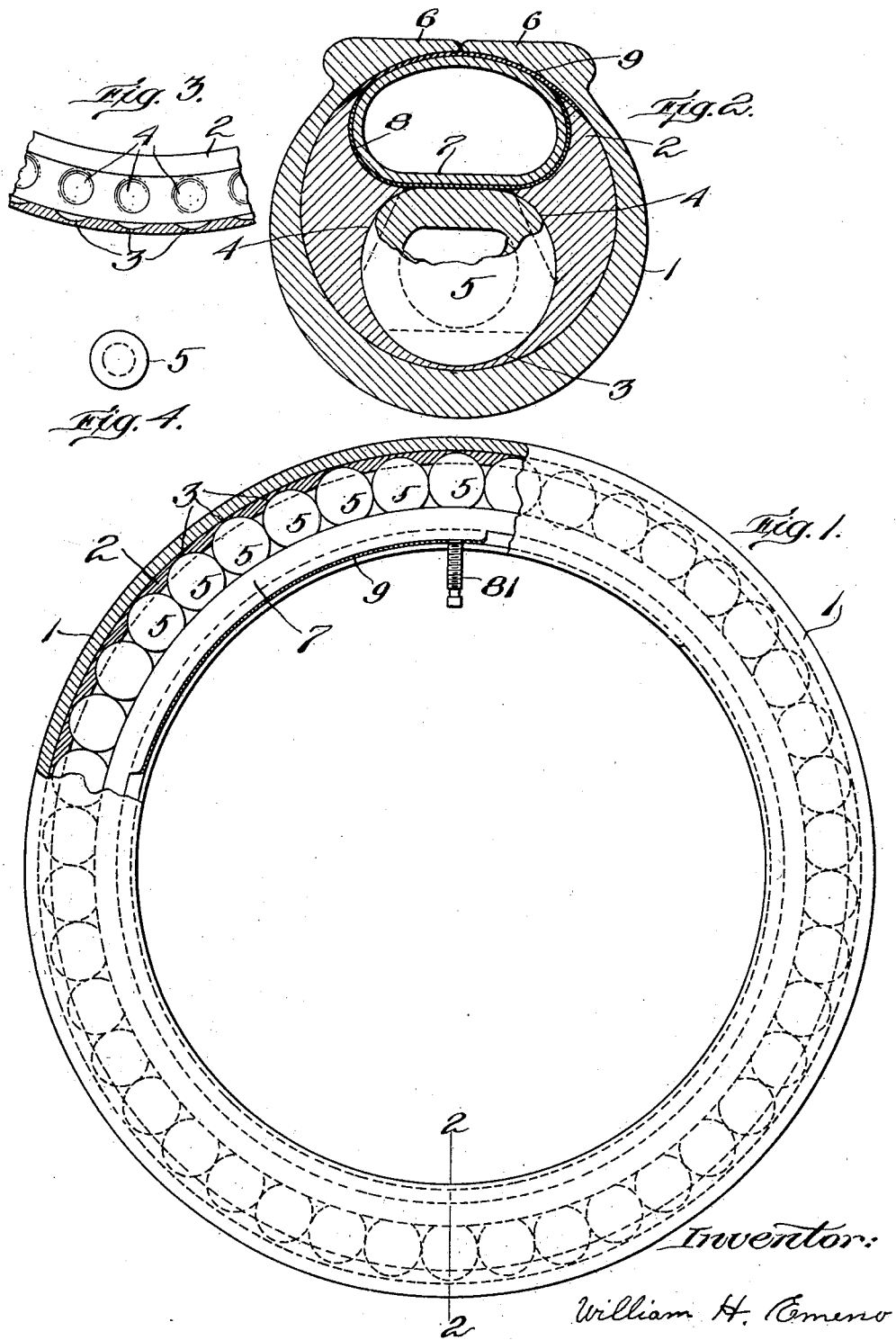

WILLIAM H. EMENO, OF CHELSEA, MASSACHUSETTS, ASSIGNOR TO SIMPLEX PNEUMATIC TIRE COMPANY, OF BOSTON, MASSACHUSETTS, A CORPORATION OF MASSACHUSETTS.

PNEUMATIC TIRE.

1,396,170.  Specification of Letters Patent.  Patented Nov. 8, 1921.

Application filed September 1, 1920. Serial No. 407,498.

*To all whom it may concern:*

Be it known that I, WILLIAM H. EMENO, a citizen of the United States, residing at Chelsea, in the county of Suffolk and State of Massachusetts, have invented certain new and useful Improvements in Pneumatic Tires, of which the following is a specification.

My invention relates to pneumatic tires and has for its object to provide an improved pneumatic tire for vehicle wheels.

In the accompanying drawings:—

Figure 1 is a side elevation, partly in section, of a pneumatic tire constructed in accordance with my invention.

Fig. 2 is a section on line 2—2 of Fig. 1.

Fig. 3 is a detail hereinafter described:

Fig. 4 is an elevation of one of the balls of the tire shown in Fig. 1.

Pneumatic tires for vehicle wheels as usually constructed have heretofore comprised an outer shoe of rubber reinforced with canvas within which was arranged an elastic inner tube of rubber containing air under pressure which expanded the inner tube against the interior of the outer shoe so as to cause it to hold the latter resiliently distended. This construction had the disadvantage that a single puncture or blow-out would exhaust all of the air from the tire and render the latter useless until repaired. My invention obviates this objectionable feature of pneumatic tires as heretofore constructed and it consists, broadly stated, in providing a multiplicity of separate independently removable, and preferably resilient, filler members within a groove or channel provided upon the interior of the tread portion of the outer shoe of a pneumatic tire, said members being arranged in a circular series between an air inflated inner tube and the tread portion of the outer shoe. This construction provides a practically puncture proof resilient tire of comparatively light weight. Other features of my invention are hereinafter pointed out.

Having reference to the drawings, 1 represents an outer shoe which, as usual, is preferably made of rubber reinforced with canvas. Within outer shoe 1 is arranged a lining 2 made from rubber and which, as herein shown, is a separate piece secured to the inside of shoe 1 by cement, by vulcanizing, or otherwise. The tread portion of lining 2 is made with an annular groove or channel whose bottom wall is formed with a circular series of pockets 3 while each side wall of said channel is made with a circular series of pockets 4, each disposed opposite one of the pockets 4 of the other side wall and one of the pockets 3.

Within the lining 2 is arranged a circular series of balls 5 each seated in one of the pockets 3 and two oppositely disposed pockets 4. The lining 2 is formed so as to provide an annular chamber between the series of balls 5 and the flaps 6 of outer shoe 1 and within this chamber is arranged a rubber inner tube 7 provided with the usual valve controlled inlet 8 through which air under pressure may be supplied to the inner tube to inflate the same. Preferably an annulus 8 of canvas or the like is placed within the shoe before inserting the inner tube 7, said annulus occupying a position between said inner tube and the balls 5, to prevent said inner tube from being forced by air pressure into the joints between the balls 5 and the side walls 2ª of the lining. Another annulus 9 of canvas placed between inner tube 7 and flaps 6 closes the joint between the latter.

The balls 5 may be either solid rubber balls or hollow rubber balls, and if the latter are employed they may each be charged with air under pressure. Also, if desired the lining 2 may be an integral part of the outer shoe 1.

The construction above described provides a practically puncture-proof pneumatic tire that is light and durable and which is so reinforced at its sides or flanks that it cannot be easily cut by the rim of the wheel.

What I claim is:

1. A pneumatic tire comprising an outer shoe made upon the inner side of its tread portion with an annular channel extending throughout the circuit thereof, the side walls of said channel each being made with a series of pockets; an inner tube within said shoe, and a plurality of separate filler members disposed in a circular series within said channel between said inner tube and the tread portion of said shoe, each of said members being seated in two oppositely disposed pockets of the side walls of said channel.

2. A pneumatic tire comprising an outer shoe made upon the inner side of its tread portion with an annular channel extending throughout the circuit thereof, the side and bottom walls of said channel each being made with a series of pockets; an inner tube within said shoe, and a plurality of separate resilient members within said channel and disposed between said inner tube and the tread portion of said shoe, each of said members being seated in two oppositely disposed pockets of the side walls of said channel and in one of the pockets of the bottom wall thereof.

3. A pneumatic tire comprising an outer shoe made upon the inner side of its tread portion with a series of pockets and also made upon the inner side of each side wall with a series of pockets; an inner tube within said shoe; and a plurality of separate rubber balls within said shoe disposed in a circular series between said inner tube and the tread portion of said shoe, each of said balls being seated in one of the pockets on the tread portion of said shoe and two oppositely disposed pockets on the side walls of said shoe.

In testimony whereof I have affixed my signature.

WILLIAM H. EMENO.